United States Patent

Phillips

Patent Number: 6,106,397
Date of Patent: Aug. 22, 2000

[54] POSITIONING DEVICE

[76] Inventor: Scott Andrew Phillips, 2A Hampden Road, Battery Point, Tasmania, 7004, Australia

[21] Appl. No.: 08/952,466
[22] PCT Filed: May 16, 1996
[86] PCT No.: PCT/AU96/00298
§ 371 Date: Dec. 8, 1997
§ 102(e) Date: Dec. 8, 1997
[87] PCT Pub. No.: WO96/36955
PCT Pub. Date: Nov. 21, 1996

[30] Foreign Application Priority Data

May 16, 1995 [AU] Australia .................................. PN2989

[51] Int. Cl.$^7$ .................................................... A63B 69/00
[52] U.S. Cl. ................................................................. 463/36
[58] Field of Search .............................. 463/36; 434/247, 434/307

[56] References Cited

U.S. PATENT DOCUMENTS

| | | | |
|---|---|---|---|
| 4,508,187 | 4/1985 | Wenzel | 180/181 |
| 4,715,460 | 12/1987 | Smith | 180/7.1 |
| 4,917,375 | 4/1990 | Lin | 272/69 |
| 4,991,126 | 2/1991 | Reiter . | |
| 5,048,632 | 9/1991 | Battel | 180/181 |
| 5,562,572 | 10/1996 | Carmein | 434/247 |
| 5,577,981 | 11/1996 | Jarvik | 434/247 |
| 5,846,134 | 12/1998 | Latypov | 463/46 |

FOREIGN PATENT DOCUMENTS

| | | |
|---|---|---|
| 90420177 | 4/1990 | European Pat. Off. . |
| 90830242 | 5/1990 | European Pat. Off. . |
| 91 06914 | 6/1991 | France . |
| 39 33 999 | 10/1989 | Germany . |

*Primary Examiner*—Valencia Martin-Wallace
*Assistant Examiner*—John Paradiso
*Attorney, Agent, or Firm*—Wells, St. John, Roberts, Gregory & Matkin, P.S.

[57] ABSTRACT

A positioning device for maintaining a user at a datum including a positional sensor for sensing a user's movement away from the datum, motive means to attach to a user's feet so that, when walking, the user is continually returned to the datum, and a controller to receive a signal from the positional sensor to activate the motive means so that it returns the user to the datum whenever the user moves from the datum.

11 Claims, 3 Drawing Sheets

POSITIONING DEVICE

FIELD OF THE INVENTION

The present invention relates to a positioning device, in particular to a device that can be used with virtual reality (VR) simulation apparatus. The device will be described primarily with reference to its use in virtual reality simulations, but it should be appreciated that the applications of the device are not so limited.

BACKGROUND ART

Virtual reality simulation involves presenting sensory information to a user of VR simulation apparatus, being any number of simulated scenarios, usually removed from the present environment of the user. In the evolution of VR simulation, users now wear goggles or headsets which include a pair of stereoscopically arranged liquid crystal projector screens, projecting for viewing to the user a computer-generated graphical environment. The headset also includes speakers for presenting accompanying aural sensations. The user often wears gloves, suits, etc fitted with sensors which sense movement of the user's body parts from a predetermined orientation and then, via a central processing unit, simulate (reproduce) that movement in the virtual realm.

User movement such as walking or running, etc, however, has only been simulated in abstract, whereby, the central processing unit projects graphically to user walking, running, etc, but without user walking or running taking place in the user's actual environment. Thus, the illusion of walking, running etc is lost to the user, because it does not correspond with their present circumstances and hence the simulation is somewhat reduced or detracted from.

Attempts have been made with VR apparatus to simulate walking, running etc, but the apparatus must then be housed in large areas or must itself be quite large. To date, this has proved to be economically unfeasible and difficult to implement.

SUMMARY OF THE INVENTION

The present invention provides a positioning device for maintaining a user at a datum including:
 a positional sensor adapted for sensing the user's movement away from the datum;
 motive means for attachment to the user's feet so that, when walking, the user is continually returned to the datum; and
 a controller adapted to receive a signal from the positional sensor and, pursuant to the user's deviation from the datum, to activate the motive means so that it operates to return the user to the datum.

By employing such a device with VR simulation apparatus, apparatus dimensions can be, maintained at around existing sizes, and additional capital outlay can be maintained at realistic levels. For example, a user can walk with such a device but can be held within a certain area so that in the virtual realm it appears to the user that they are walking (ie. they receive normal physical sensations of walking, and further this walking is simulated for them in the virtual realm), and yet the user's position is confined to a small area.

Preferably the sensor is adapted for mounting to the user at a position so that the datum is generally centred on a vertical line extending through the sensor; and, when the user has moved from the datum, the motive means returns the user to the datum only when brought into contact with surrounding ground.

Thus the motive means is attached to the users feet and can be positioned at or within a surface, so that when the user is walking, the user is continually returned to the datum.

The motive means can be located within a type of shoe attachable to each foot of the user and can include:
 a tracking means arranged for engaging and moving the shoe relative to the ground upon which the user walks in use; and
 a motor means operable on the tracking means to drive the same, wherein the motor means is responsive to the signal from the controller whereby, upon activation, it drives the tracking means so that each user's shoe is moved on the ground to return the user to the datum.

In this regard, the tracking means can be a plurality of track balls, each rotatably retained within a respective socket formed in the underside of the shoe but so as to partially protrude therefrom to engage the ground, and the motor means is a plurality of motors housed within the shoe, each connected to one or more drive shafts which in turn are operable on the track balls to cause rotation thereof, and such that when each shoe is brought into contact with the ground, the driven rotation of the track balls causes the shoe to be moved so that the user is returned to the datum.

It is also preferred that each shoe incorporates an additional positional sensor so that the controller can sense any deviation that each foot has from a forward facing orientation when standing and a forwardly directed walking orientation when walking, and so that the motive means is activated accordingly by the controller to return the user to the datum.

The datum can be an area (eg. a circular area in which the user is to be maintained) or for computational purposes, can be an imaginary vertical axis to which the is motive means returns the user (eg. so that the sensor becomes aligned with that vertical axis).

BRIEF DESCRIPTION OF THE DRAWINGS

Notwithstanding any other forms which may fall within the scope of the present invention, preferred forms of the invention will now be described, by way of example only, with reference to the accompanying drawings in which.

MODES FOR CARRYING OUT THE INVENTION

Figure 1:
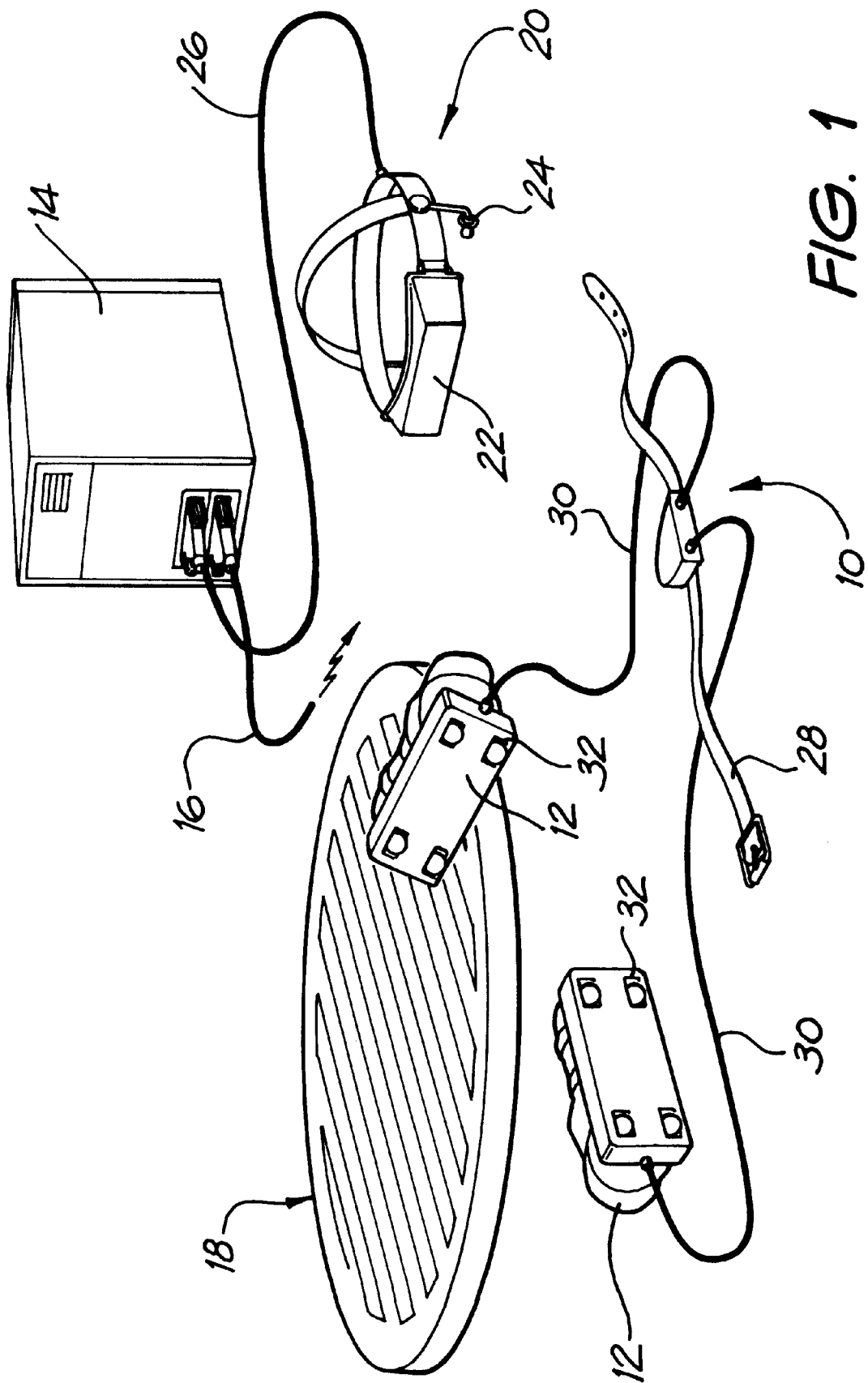
FIG. 1 shows a perspective view of one type of preferred positioning device according to the invention.

Referring to FIG. 1, a positioning device for maintaining a user at a datum can include a positional sensor in the form of tracker 10 for sensing the user's movement away from the datum, a motive means in the form of motorised shoes 12 which, when worn by a user, can be operated to move the user back to the datum, and a controller in the form of computer (or IC controller) 14 which can be programmed so that it is responsive to a signal from the tracker 10 and so that it causes the motorised shoes to operate in a manner that returns the user to the datum (eg. when the user is walking).

The computer 14 either communicates remotely with tracker 10 (eg. via radiowave, infrared signals etc) or is connected to the tracker via communication line 16. In this regard, the tracker may be a Space Pad™ tracker (trade mark of Ascension Technology Corporation). Trackers like the Space Pad™ tracker drive a transmitter which can be a long strand (loop) of electrically conductive wire arranged in matting 18 upon which the user stands. The datum to which the user is returned is preferably also defined by (or is within) the boundaries of the matting. Thus, in one preferred mode of use, the user stands on and is confined to the matting when walking, running etc.

When the device is used with virtual reality simulation apparatus, including virtual reality simulation software loaded into computer 14, the user may also employ a headset 20, which incorporates a projector housing 22 having fitted therein a pair of stereoscopically adjusted liquid crystal screens, one for each eye, (as is known). The headset also includes earpiece speakers 24 which fit into the user's ears. Thus, the headset provides both visual and aural imagery to the user as part of the virtual reality simulation. The graphical and aural information and power for the headset is supplied via second communication line 26.

The user can fit the tracker to his/her torso by strapping a belt 28 therearound. Typically, the tracker is located adjacent to the user's navel (although it may also be located at the user's forehead), the navel being close to the user's centre of gravity. Thus, the tracker is positioned to be most sensitive to user movement such as walking (ie. when commencing walking, movement simultaneously with leg movement commences at the user's centre of gravity).

Each motorised shoe may also include a positional tracker (not shown) which can sense deviations of the shoe from predetermined inclinations (described below). This information is fed to the tracker 10 via lines 30 and is then on-fed to the computer.

Each motorised shoe includes four socket-recesses 32 located in the underside thereof, each housing a drive ball mechanism (described in more detail below) and which is configured when activated to drive the shoe in any direction in the horizontal plane.

In one mode of use, the user attaches the tracker around their waist using belt 28, and then places the shoes 12 on each foot and also places headset 20 thereon. (In addition, the user may attach VR-type gloves, bodysuit etc, but not described herein). The user then stands centrally on matting 18, usually in a balanced position with both feet slightly apart. The computer is then configured so that this is position is recorded as the start (or datum) position and then the virtual reality simulation can commence.

As the user starts walking, tracker 10 moves forward. This movement is reproduced by the computer (which receives positional information from tracker 10 and from the shoe trackers) in the virtual realm so that it appears to the user that they are walking in the graphically presented simulation. The movement also activates the motorised shoes so that upon placement of each shoe on the matting, the user's foot is returned (moved back in an opposite sense) so that the user is generally maintained at the datum. If the user is pigeon-toed or skew-footed, the sensors in the shoes record this so that the shoe is moved back to the datum position accordingly, and similarly for any turning that the user may engage in when walking, or for any deviation from a directly forward walking or backward walking stride.

Thus, the user has the sensation of walking, but a large scale apparatus is not needed to accommodate the walking. Rather, the user can be maintained at (or around) the datum.

Figure 2:
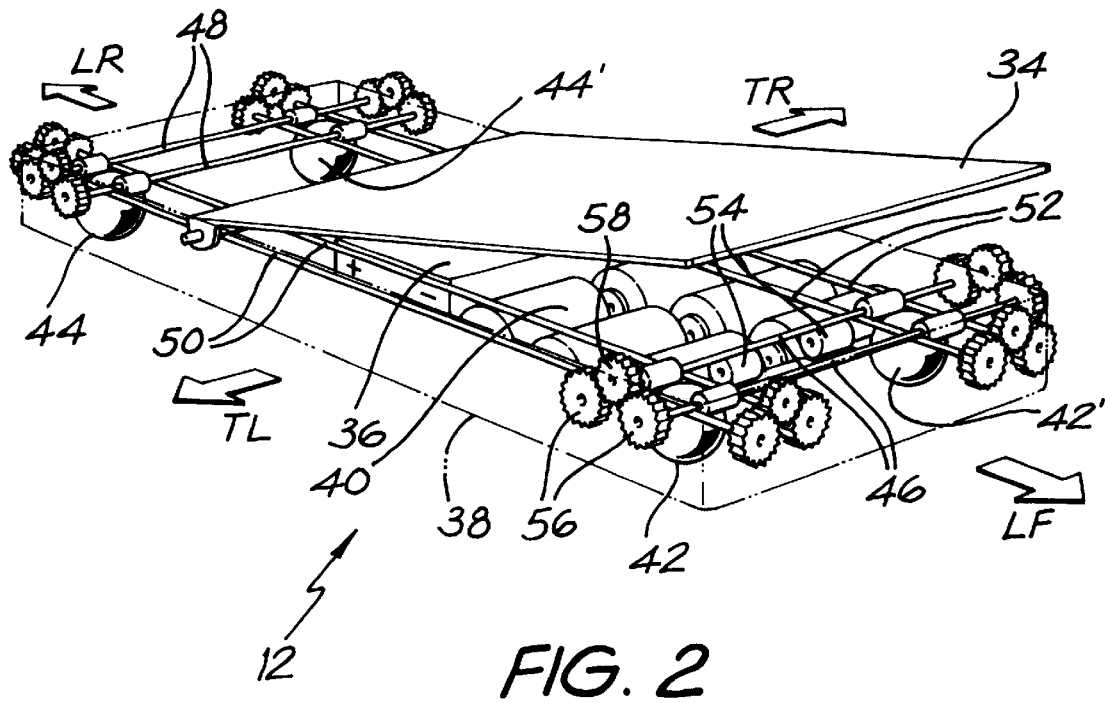
FIG. 2 shows a perspective exploded underside view of part of the device shown in FIG. 1.
Figure 3:
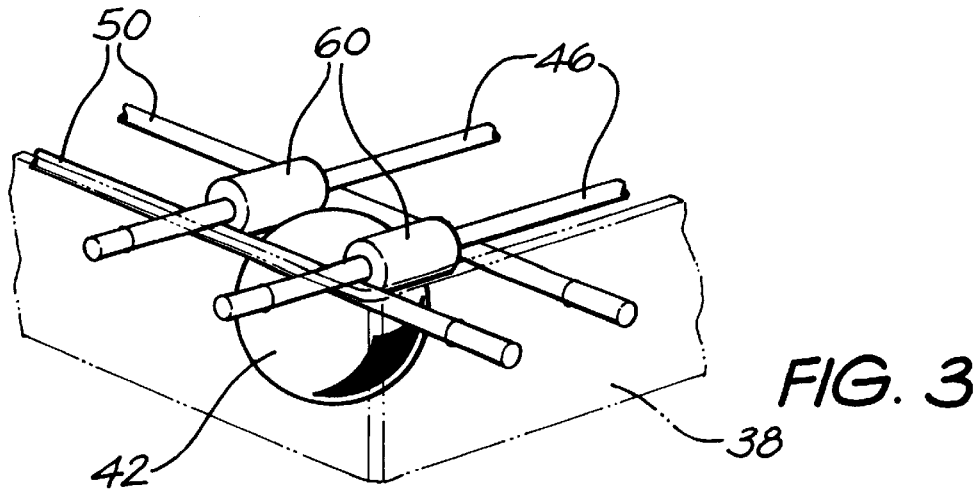
FIG. 3 shows a perspective detail of part of the device shown in FIG. 2.
Figure 4:
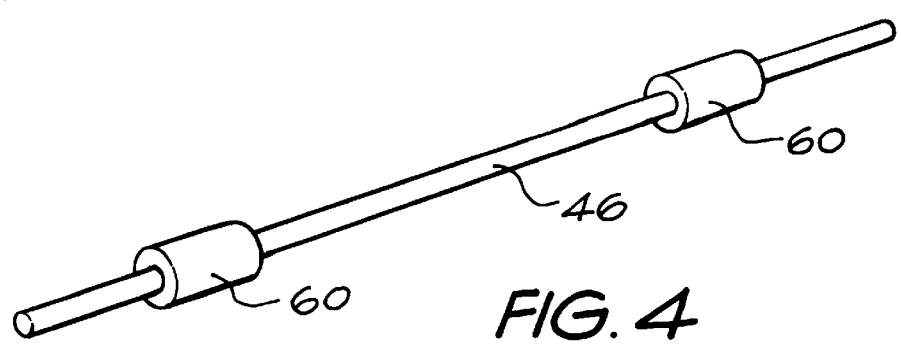
FIG. 4 shows a component in perspective view, being a part of the device shown in FIG. 2.

Referring now to FIGS. 2 to 4, a more detailed description of the construction and operation of the motorised shoes 12 will be given. FIG. 2 shows a perspective view of the motorised shoe 12, with the shoe upper portion removed therefrom for clarity.

A lift plate 34 is positioined above the drive mechanism and is pivotable with respect to the mechanism. For example, the plate 34 can be raised and lowered hydraulically, pneumatically or via a motor drive when a user is walking with the shoe, to simulate the heel lift and heel return that occurs through a user's stride. In this manner, the shoe drive mechanism can be maintained basically parallel to the ground so that the drive balls (described below) are brought evenly into contact therewith (eg. all balls simultaneously engaging the ground) when the shoe is replanted on the ground. This action assists in the device allowing the user to engage in walking that is as close as possible to a natural walking style. The sequence of plate lift and lowering can be programmed or sensed and controlled by the computer for each individual user (eg. where the computer learns or memorises each user's walking peculiarities and records these for the subsequent times when that user returns to use the device).

A power source 36 (eg. battery, or electrical transformer) is located in the centre of a mechanism casing 38. The power source drives a number of motors 40 housed within the casing in a variety of sequences as determined by controlling software in computer 14.

Typically the motors are low inertia, high torque type motors to enable rapid starting and arrest, and to readily accommodate users of varying weights.

The casing 38 has the socket recesses 32 formed in the underside thereof which house four drive balls, namely, front drive balls 42, 42' and rear drive balls 44, 44' and such that a portion of each ball (eg. 2 mm) protrudes beyond the underside of the casing for engaging the ground. The drive balls are drivingly rotated by the mechanism so that when they are brought into contact with the ground, they cause the motorised shoe to be moved over the ground (ie. when fitted to the user).

Driving of the drive balls is accomplished by a plurality of drive rods. Front transverse drive rod pair 46 and rear transverse drive rod pair 48 cause, respectively, the front drive balls 42, 42' and the rear drive balls 44, 44' to be driven either longitudinally forwardly in the direction of arrow LF or longitudinally rearwardly in the direction of arrow LR, depending on the way in which the rods are rotated. On the other hand, left longitudinal drive rod pair 50 and right longitudinal drive rod pair 52 cause, respectively, left drive balls 42, 44 and right drive balls 42', 44' to move the shoe transversely (either transversely to the left in the direction of arrow TL or transversely to the right in the direction of arrow TR).

Each rod has an end gear 56 arranged thereon to define a pair of end gears at each end of each rod pair. These gears are connected together at each end by a respective intermediate gear 58 so that driving rotation of one of the rods is translated to the other rod and thus for forward or transverse movement, each drive ball is driven by two drive rods. The gears can be engaged by a respective motor at each end to drive the drive rods. For example, a motor can be connected directly (or via gearing etc) to the intermediate gear, which when rotated, rotates both end gears 56 and hence both respective drive rods to then drive one or two of the drive balls.

Alternatively, each drive rod pair is driven by rotating contact from a pair of motor driven rollers 54 (only two such motor driven rollers are shown in the drawings for clarity). In FIG. 2, the motor driven rollers 54 engage and rotate the left rod of the front transverse drive rod pair 46 and rotate it either clockwise or counter-clockwise based on information from the computer.

As seen in FIG. 3, drive ball 42 is driven by front transverse drive rod pair 46 and left longitudinal drive rod pair 50. Because the transverse drive rod pair overlays the longitudinal drive rod pair, each transverse drive rod is provided with an extension roller 60 to enable drive contact with the drive ball (ie. so that the transverse drive rod rotation can be imparted to the drive ball). The crisscrossing of the transverse and longitudinal drive rod pairs at each drive ball also provides a supporting base to each socket, whereby the weight of the user and the shoe is transferred via the drive rods to each drive ball.

To achieve only longitudinal forward or rearward motion, only the front and/or rear transverse drive rod pairs are rotated by the motors 40. Similarly, to achieve only left or right transverse motion, only the left and/or right longitudinal drive rod pairs are rotated by the motors. To achieve diagonal, curvilinear or other directional movement of the shoes in the horizontal plane, both the transverse and longitudinal drive rod pairs are driven simultaneously and, depending on the direction of motion required, at different rates (speeds).

FIG. 4 shows a transverse drive rod clearly illustrating the position of the extension rollers 60.

Figure 5:
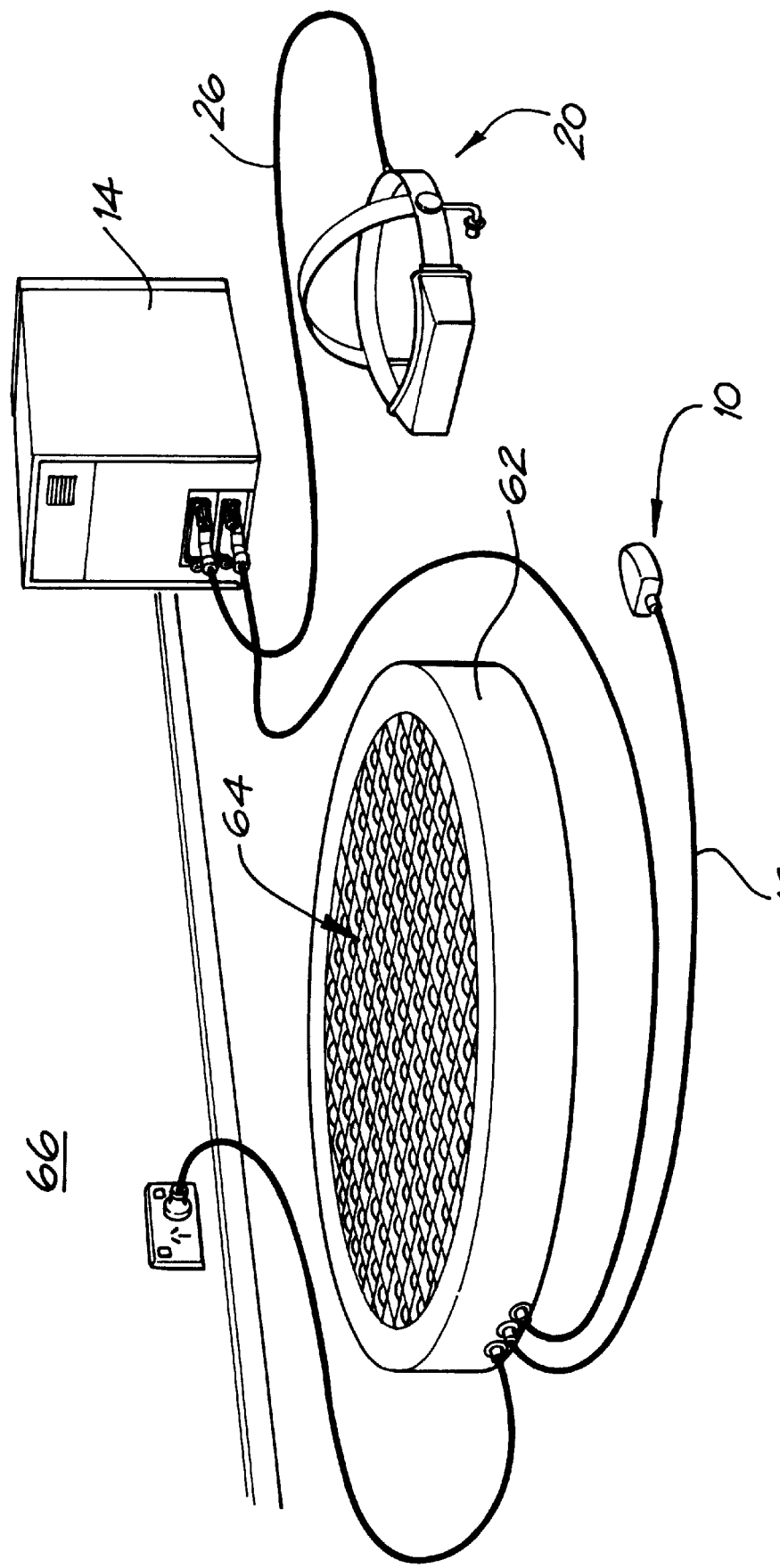
FIG. 5 shows a perspective view of an alternative positional device.

Referring to FIG. 5, where like reference numerals will be used to denote like parts, instead of employing motorised shoes, a platform 62 having a plurality of drive balls 64 arranged therein in a grid-like formation on the upper surface of the platform is provided. The balls are each arranged in respective sockets and protrude slightly above the upper surface (eg. by 2 mm) for ease of engagement by the user. Each row of drive balls in either the longitudinal or transverse direction is driven by drive rods in a similar manner to the mechanism operation of FIG. 2. Thus, each individual drive ball sits on and is driven by a pair of transverse and a pair of longitudinal drive rods. A plurality of respective motors is arranged within and is either connected to the drive rods directly via motor driven rollers, or directly engages the end gears or intermediate gears, such motors being located within the platform itself.

In one mode of use, a user again stands on the platform, generally centrally and with the user's feet spaced slightly apart. A datum position is then recorded by the computer software and, once the user is fitted with the VR apparatus, and commences walking, the walking movement of the user is sensed and a predetermined number of drive balls are activated. For example, with the user stepping forward on the platform 62 when facing wall 66, the drive balls in say the top three or four rows are rotated so that after stepping thereon, the user's foot is moved backwardly. Shortly thereafter, the user steps forward with the other foot and, when lifting the other foot, further or move successive central rows are activated to progressively move the user's first foot back towards it's original position. A simultaneous and similar sequence of activation then occurs for the other foot. Activating combinations of transverse and longitudinal rows is employed when the user walks diagonally, turns left or right, walks rearwardly etc, and all the necessary calculations are performed rapidly by the computer 14.

Typically the tracker 10 is a 3-dimensional tracking device, such as a Space Pad™ tracker or a Polhemus™ sensor (trade mark of 3 Space Corp). The platform 18 or the platform 62 can incorporate a magnetic source, a wiring loop or other similar means to provide an initial reference point (datum) to and within which the user is to be maintained.

The or each tracker (ie. including the trackers used in the motorised shoes) can be configured to output six channels of information that correspond to X, Y and Z positions in 3-dimensional space and X, Y and Z orientation relative to the magnetic source, wiring or other sensor in the platform 62 or matting 18.

As an alternative to computer 14 controlling the motorised shoes 12 or the platform drive balls 64, an intermediate integrated circuit located in the platform, in the tracker 10 itself then receives the six channel signal from each tracker. This information is used to calculate the user's position (and the computer can then re-display it in the virtual realm). At the same time, the X (ie. transverse) and Z (ie. longitudinal) position signals can be used to calculate the degree of rotation required in the specific drive balls (either in the motorised shoes 12 or platform drive balls 64) to return the user (eg. the sensor) to the datum.

Thus, essentially the user can engage in a normal walking motion, which provides to the user a complete illusion of movement in the horizontal plane, whilst in actual fact the movements are confined within a comparatively small area. However, in the virtual realm it appears to the user that they are in fact moving through horizontal space (as is desirable for maximum simulation in the virtual realm).

The use of the device in VR apparatus is not limited to walking, running etc and may be employed where the user is simulating other types of motion, for example, from sitting positions.

Typically, many of the components are formed from light-weight but hard-wearing plastics to provide the user with maximum freedom of movement. However, hard-wearing components subject to high torque and high twisting forces are typically formed from treated steel alloys (eg. hardened at the outer surface thereof).

Whilst the invention has been described with reference to a number of preferred embodiments, it should be appreciated that the invention can be embodied in many other forms.

I claim:

1. A positioning device for maintaining a user at a datum including:
   a positional sensor adapted for sensing the user's movement away from the datum;
   motive means for attachment to the user's feet so that, when walking, the user is continually returned to the datum; and
   a controller adapted to receive a signal from the positional sensor and, pursuant to the user's deviation from the datum, to activate the motive means so that it operates to return the user to the datum.

2. A device as claimed in claim 1, wherein the sensor is adapted for mounting to the user at a position so that the datum is generally centred on a vertical line extending through the sensor; and, when the user has moved from the datum, the motive means returns the user to the datum only when brought into contact with surrounding ground.

3. A device as claimed in claim 1, wherein the motive means is located within a type of shoe attachable to each foot of the user and includes:
   a tracking means arranged for engaging and moving the shoe relative to the ground upon which the user walks in use; and
   a motor means operable on the tracking means to drive the same, wherein the motor means is responsive to the signal from the controller whereby upon activation, it drives the tracking means so that each user's shoe is moved on the ground to return the user to the datum.

4. A device as claimed in claim 3, wherein each shoe incorporates an additional positional sensor so that the controller can sense any deviation that each foot has from a forward facing orientation when standing and a forwardly directed walking orientation when walking, and so that the motive means is activated accordingly by the controller to return the user to the datum.

5. A device as claimed in claim 3, wherein the tracking means is a plurality of track balls, each rotatably retained within a respective socket formed in the underside of the shoe but so as to partially protrude therefrom, and the motor means is a plurality of motors housed within the shoe, each connected to one or more drive shafts which in turn are operable on the track balls to cause rotation thereof, and such that when each shoe is brought into contact with the ground, the driven rotation of the track balls causes the shoe to be moved so that the user is returned to the datum.

6. A device as claimed in claim 5, wherein each shoe includes four track balls, with two located at opposing left and right sides at a front underside and two located at opposing left and right sides at a rear underside of the shoe, and wherein both of the two front track balls and both of the two rear track balls are engaged by a respective pair of transversely extending drive shafts which, when rotated by respective motors impart forward or rearward motion to the track balls, whereas both of the two left side track balls and both of the two right side track balls are engaged by a respective pair of longitudinally extending drive shafts which, when rotated by respective motors impart left or right transverse motion to the track balls, with each drive shaft pair at at least one end thereof being driven by a separately activatable motor, so that each shoe can be moved on the ground in any direction.

7. A device as claimed in claim 1, wherein the datum is:
   (a) an area in which the user is to be maintained; or
   (b) an imaginary vertical axis that is determined by the controller; so that the controller operates the motive means until the positional sensor is positioned within the area or is at a predetermined location with respect to the axis.

8. A device as claimed in claim 1, wherein the positional sensor is adapted for being positioned at or close to the user's centre of gravity for early sensing of user walking movement, and optionally at the user's navel or forehead.

9. A device as claimed in claim 1 when used in conjunction with virtual reality simulation apparatus.

10. A device as claimed in claim 9, wherein each movement of the user from the datum is simulated by a processor and is reproduced in a virtual realm perceivable by the user.

11. A device as claimed in claim 10, wherein the device is used to return the user to the datum when walking, whereas that walking is simulated in the virtual realm.

* * * * *